United States Patent
Jacob et al.

(10) Patent No.: US 6,796,686 B2
(45) Date of Patent: Sep. 28, 2004

(54) COLOR-CORRECTED HOLLOW PRISMATIC LIGHT GUIDE LUMINAIRE

(75) Inventors: Stéphane Frederick Jacob, Port Moody (CA); Allan Brent York, Langley (CA)

(73) Assignee: TIR Systems Ltd., Vancouver (CA)

( * ) Notice: Subject to any disclaimer, the term of this patent is extended or adjusted under 35 U.S.C. 154(b) by 59 days.

(21) Appl. No.: 10/264,483

(22) Filed: Oct. 4, 2002

(65) Prior Publication Data

US 2004/0066654 A1 Apr. 8, 2004

(51) Int. Cl.[7] ............................................... F21V 9/08
(52) U.S. Cl. ...................... 362/293; 362/583; 362/340
(58) Field of Search ................................. 362/293, 308, 362/328, 339, 31, 340, 583

(56) References Cited

U.S. PATENT DOCUMENTS

| | | | |
|---|---|---|---|
| 4,615,579 A | 10/1986 | Whitehead | |
| 4,750,798 A | 6/1988 | Whitehead | |
| 4,787,708 A | 11/1988 | Whitehead | |
| 4,850,665 A | 7/1989 | Whitehead | |
| 5,219,217 A | * 6/1993 | Aikens | ........................ 362/560 |
| 5,258,896 A | 11/1993 | Dreyer, Jr. | |
| 5,339,382 A | 8/1994 | Whitehead | |

OTHER PUBLICATIONS

"About Light Guides," web site publication of TIR Systems Ltd., Vancouver, B.C., Canada at http://www.tirsys.com/gl–technology/b_tech.html.

"Colour," website publication of TIR Systems Ltd., Vancouver, B.C., Canada at http://www.tirsys.com/gl–technologY/b_color.html.

"Colour Change Design Information," web site publication of TIR Systems Ltd., Vancouver, B.C., Canada at http://www.tirsys.com/gl–application/b_colorchng02.html.

* cited by examiner

*Primary Examiner*—Alan Cariaso
*Assistant Examiner*—Guiyoung Lee
(74) *Attorney, Agent, or Firm*—Oyen Wiggs Green & Mutala

(57) ABSTRACT

The color temperature of light emitted by a luminaire having a hollow prismatic light guide is varied to counteract aesthetically undesirable reddening gradient of the emitted light. Reddening is caused by the light guide's dielectric material, which absorbs blue light rays such that proportionately more red than blue rays are guided to the light guide's far end than to points near the guide's light input end. Flare light rays which escape through the light guide near its light input end are color filtered and reflected back into the light guide. The filter color lies within a CIE-1931 chromaticity diagram {4800° Kelvin; 570 nm; 600 nm} color gamut triangle. Color filtering absorbs blue flare rays as a function of distance along the guide, imparting a near-end reddening gradient to the emitted light in inverse proportion to the far-end reddening gradient, giving the emitted light a constant apparent color, independent of distance along the guide.

11 Claims, 4 Drawing Sheets

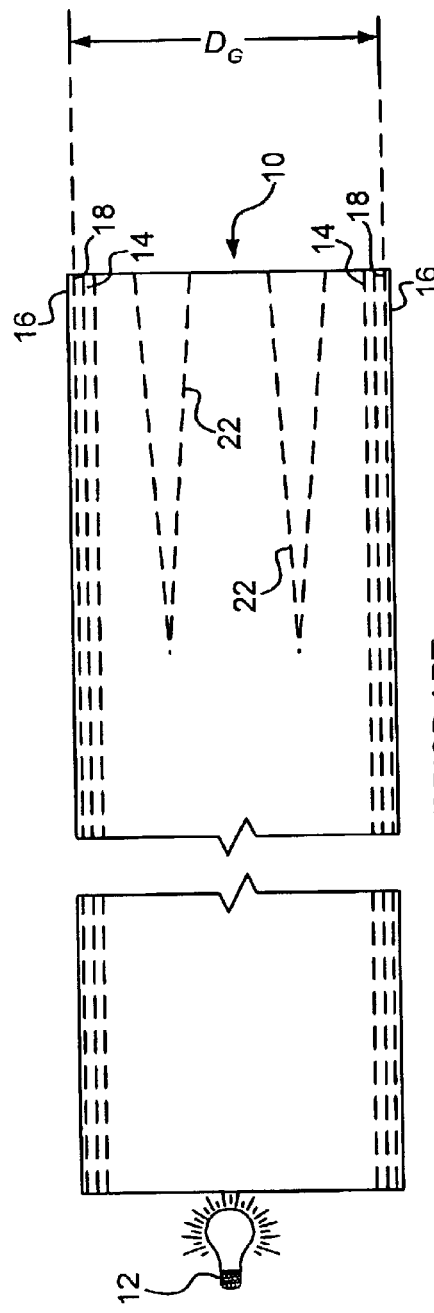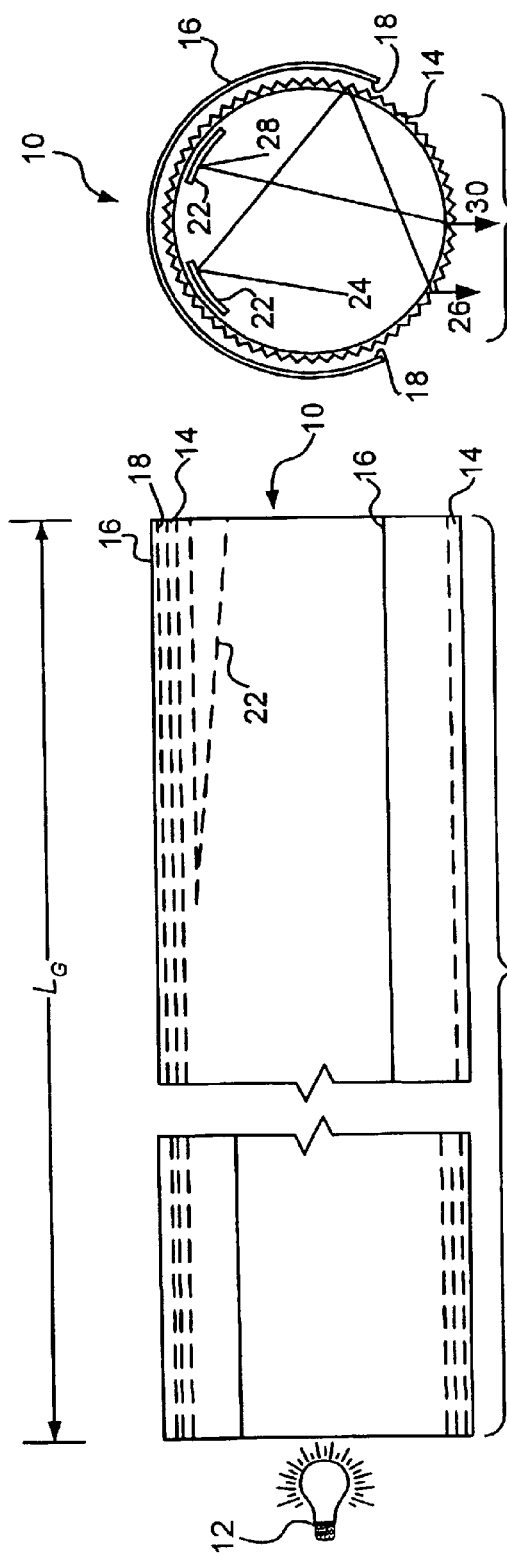

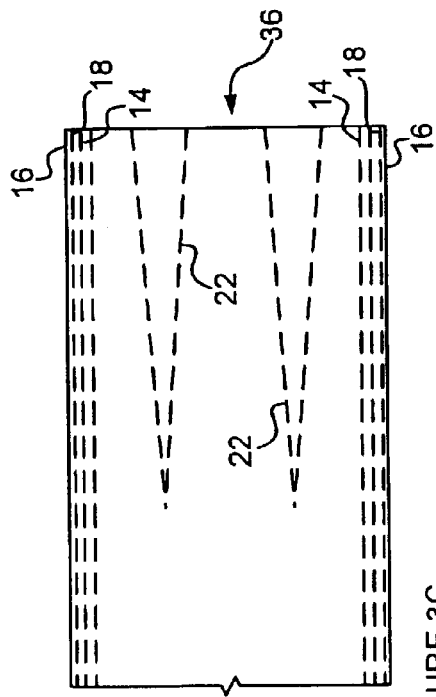
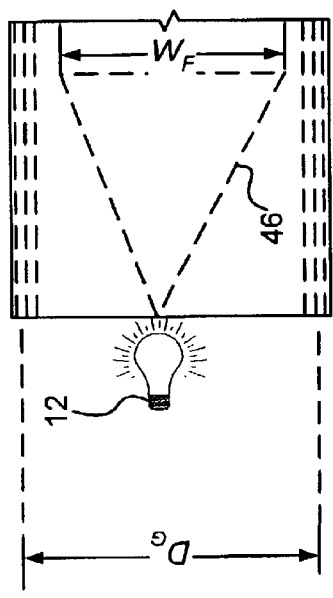
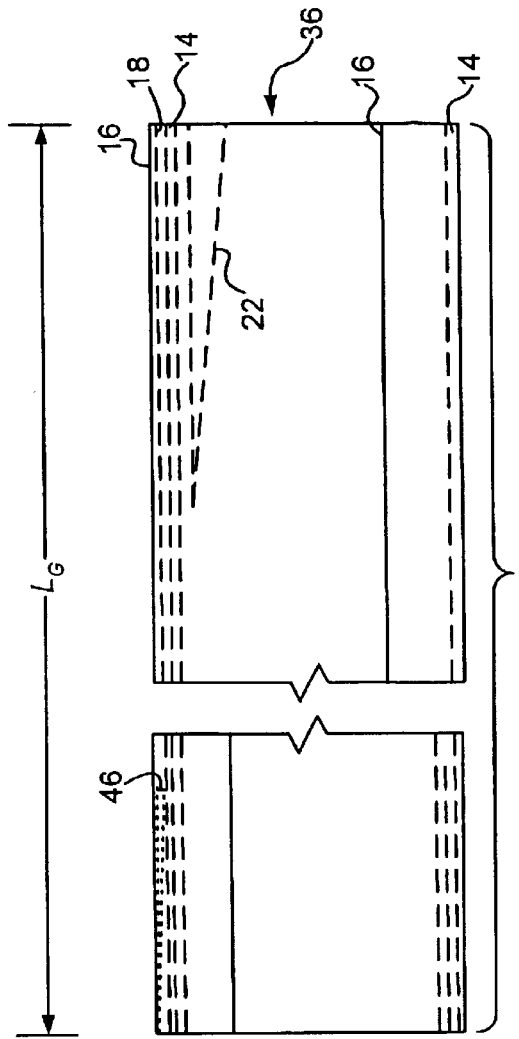
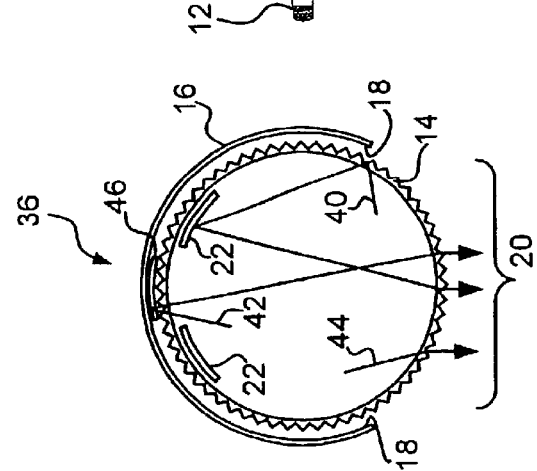

COLOR-CORRECTED HOLLOW PRISMATIC LIGHT GUIDE LUMINAIRE

TECHNICAL FIELD

The color temperature of light emitted by a hollow prismatic light guide luminaire is varied by yellow hue filtering flare light near the light guide's light input end to counteract aesthetically undesirable far-end reddening gradient of the emitted light.

BACKGROUND

FIGS. 1A–1C depict a prior art hollow prism light guide luminaire 10 generally representative of those described in U.S. Pat. Nos. 4,615,579; 4,750,798; and, 4,787,708 (Whitehead). As explained in U.S. Pat. No. 5,339,382 (Whitehead) light rays emitted by light source 12 are guided along and confined within light guide 14 by means of total internal reflection. Light guide 14 is housed within an opaque cover 16 having a reflective inner surface 18 and a light emitting aperture 20. One or more white-colored diffuse light extractors 22 are provided within guide 14. Light rays guided along guide 14 occasionally strike extractor 22, causing a random change in the direction of such rays; usually into a direction which guide 14 is unable to confine by total internal reflection, thus allowing such rays to escape from guide 14. For example, a light ray originating at point 24 is reflected by extractor 22 and strikes guide 14 at an angle which results in further reflection of the ray such that it escapes through the wall of guide 14 and is emitted through aperture 20 in a direction 26. Similarly, a light ray originating at point 28 strikes extractor 22, escapes through guide 14 and is emitted through aperture 20 in direction 30.

Light rays emitted through aperture 20 can be used for interior space illumination. In such case, luminaire 10 is preferably configured to emit substantially uniformly bright light through all points along aperture 20 as is for example explained in U.S. Pat. No. 4,850,665 (Whitehead). But, because the refractive index and light transmissivity characteristics of the dielectric material used to form light guide 14 vary as a function of wavelength, an aesthetically undesirable color gradient is observed along luminaire 10. More particularly, light guide 14 absorbs some blue light rays, so as distance from light source 12 increases, progressively fewer blue light rays are guided along light guide 14. Consequently, light emitted through aperture 20 at distances farther from light source 12 is perceived as more "red" than light emitted through aperture 20 at distances closer to light source 12, even if the emitted light is uniformly bright at all points on aperture 20. This color temperature drop or far-end "reddening" of light guide 14 as a function of distance from light source 12 is on the order of 600 degrees Kelvin relative to a nominal correlated color temperature for a typical light guide having a length $L_G$ greater than 20 times the light guide's diameter $D_G$. FIG. 2A graphically illustrates the color temperature drop along light guide 14 and also shows that luminaire 10's luminance characteristic is reduced (typically by as much as 30%) as a function of distance along light guide 14 due to light absorption losses.

Preferably, no visually perceptible color gradient is observable along luminaire 10. A typical prior art technique for reducing the observable color gradient is to vary the color of extractor 22 as a function of distance from light source 12 along light guide 14. Typically, extractor 22 is located at the end of light guide 14 farthest from light source 12 and has a light transmissivity characteristic which varies as a function of distance from light source 12 along light guide 14, to achieve the desired uniformly bright light emission through all points along aperture 20. If extractor 22 has a blue color and varies in width as a function of distance from light source 12 along light guide 14 (less blue extractor material at the end of extractor 22 closest to light source 12 and progressively more blue extractor material toward the end of extractor 22 farthest from light source 12) reddening of light guide 14 is offset since extractor 22 preferentially passes blue light while absorbing red light as a function of distance from light source 12 along light guide 14. As FIG. 2B graphically illustrates, the red absorption required to effectively offset far-end reddening of light guide 14 reduces luminaire 10's luminance characteristic by as much as 40% by absorbing a significant fraction (as much as 10%) of the red light rays guided along light guide 14. Such absorption losses are unacceptable in many lighting situations since they may require a more expensive light source having greater light output capability to achieve a desired minimum output luminance. Moreover, because extractor 22's shape typically varies along light guide 14 as a function of distance from light source 12 (see FIGS. 1A and 1C) luminaire 10's perceived color depends on the observer's viewing angle relative to luminaire 10, which is aesthetically undesirable.

This invention offsets far-end reddening in a hollow prismatic light guide luminaire without significantly reducing the luminaire's luminance characteristic.

SUMMARY OF INVENTION

The invention facilitates color temperature variation of light emitted by a luminaire having a hollow prismatic light guide formed of a material which absorbs blue light rays such that more red light rays are guided along the light guide at distances father from a light input end of the light guide than at distances closer to the light input end. The desired color temperature variation is achieved by color filtering flare light rays which escape through the light guide at points close to the light input end and reflecting the color filtered light rays back into the light guide. The filter color lies within a CIE-1931 chromaticity diagram {4800° Kelvin; 570 nm; 600 nm} color gamut triangle.

The amount of color filtering is advantageously varied as a function of distance along the light guide and in inverse proportion to the absorption of blue light rays by the light guide material. This can be achieved by varying the filter's intensity (color saturation) as a function of distance along the light guide, or by varying the filter's width as a function of distance along the light guide, or by varying both the filter's color intensity and width as a function of distance along the light guide.

BRIEF DESCRIPTION OF DRAWINGS

FIGS. 1A, 1B and 1C are respectively fragmented side elevation, right end and fragmented top plan views of a prior art hollow prismatic light guide luminaire.

FIGS. 3A, 3B and 3C are respectively fragmented side elevation, left end and fragmented top plan views of a color-corrected hollow prismatic light guide luminaire in accordance with the invention.

Figure 2A:
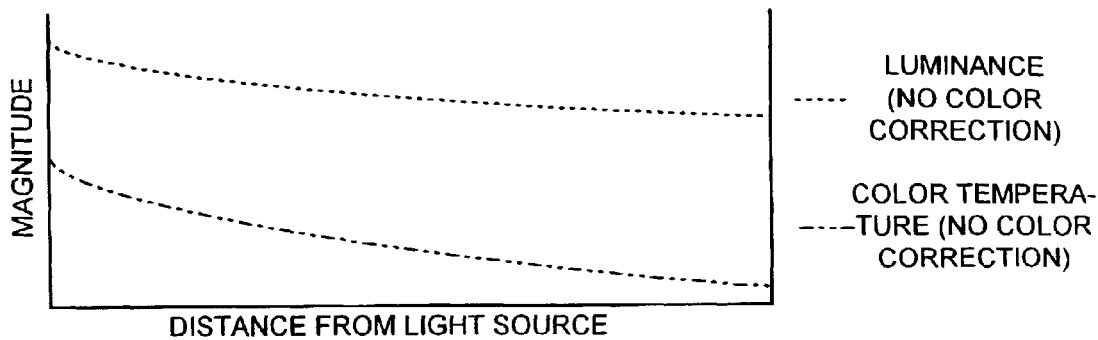
FIGS. 2A and 2B respectively graphically depict luminance and color temperature variation as a function of distance along the FIGS. 1A–1C luminaire for the cases in which the light guide contains a white-colored (FIG. 2A) and a blue-colored (FIG. 2B) light extractor. The FIG. 2A curves are included in FIG. 2B for comparison.
Figure 2B:
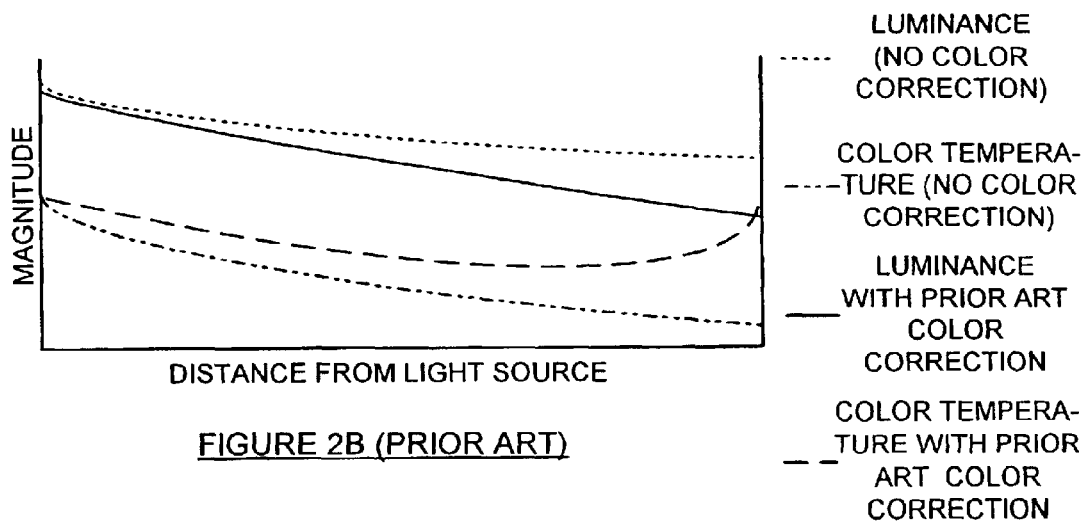

3A–3C luminaire. The FIG. 2A curves are included in FIG. 4 for comparison.

Figure 5:
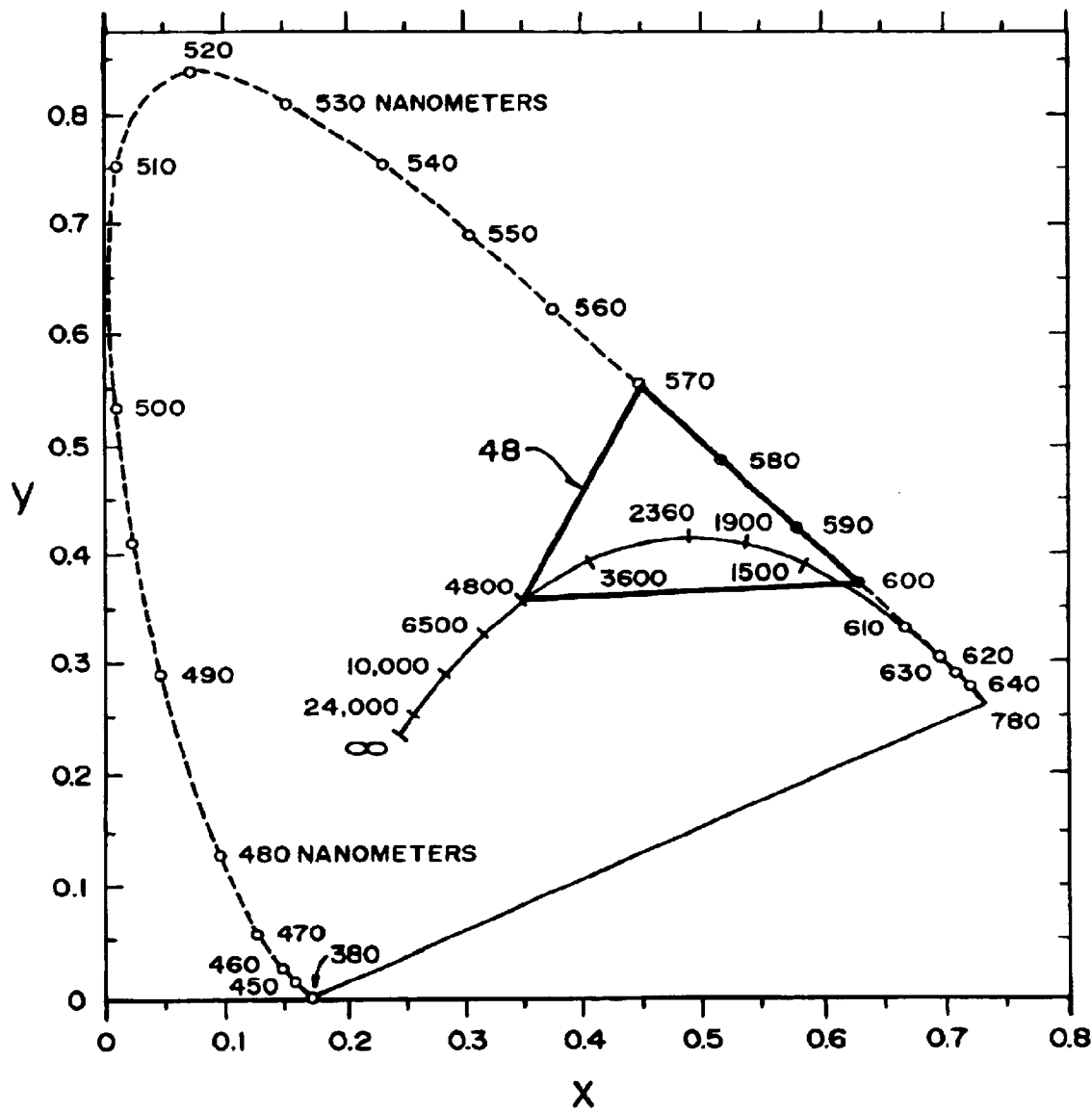

FIG. 5 is a CIE-1931 chromaticity diagram with a triangle superimposed over a color gamut representative of filter colors suitable for use in practicing the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

FIGS. 3A, 3B and 3C depict a color-corrected hollow prismatic light guide luminaire 36 in accordance with the invention. Components which are common to the FIGS. 1A–1C prior art and to the FIGS. 3A–3C embodiment of the invention bear the same reference numerals in both sets of Figures. Instead of being blue as described above in relation to prior art luminaire 10, luminaire 36's extractor 22 is white, as in a prior art non-color-corrected hollow prismatic light guide luminaire.

Before further describing the invention, it is useful to note that FIG. 3B shows three types of light rays 40, 42, 44 emitted through aperture 20. Light ray 40 is guided (i.e. reflected and refracted) by light guide 14 toward extractor 22 which reflects ray 40 so that it is emitted through aperture 20. Light ray 42 encounters light guide 14 at an angle outside the critical range of angles within which light guide 14 is able to totally internally reflect (i.e. guide) light. Consequently, light ray 42 escapes through light guide 14 and is reflected by cover 16's reflective inner surface 18 back through light guide 14 and through aperture 20. Light ray 44 also encounters light guide 14 at an angle outside the critical range of angles within which light guide 14 is able to totally internally reflect light, but escapes through light guide 14 and aperture 20 without encountering cover 16. Light rays 42 and 44 are called "flare rays." Light guide luminaire designers expend considerable effort attempting to minimize flare rays, which are undesirable because they are unguided and thus easily lost by absorption before they can be usefully emitted through aperture 20. FIG. 3B does not depict light rays which are guided by and along light guide 14 for potential subsequent emission through aperture 20. It is these guided light rays which are susceptible to color change due to the aforementioned far-end reddening effect, which is desirably reduced and ideally eliminated.

In accordance with the invention, a transparent yellow filter 46 is provided within luminaire 36, between light guide 14 and cover 16, at the end of light guide 14 closest to light source 12. Filter 46 may be formed of yellow ScotchCal™ plastic sheet material available from Minnesota Mining & Manufacturing Company, Saint Paul, Minn.; or, formed of yellow Mylar™ film material available from E.I. duPont De Nemours and Company, Wilmington, Del. Flare light rays such as ray 42 which escape through light guide 14 pass through filter 46 and are reflected by cover 16's reflective inner surface 18 back through filter 46 and through light guide 14 before they are emitted through aperture 20. Yellow filter 46 absorbs blue flare light rays, without affecting non-flare light rays guided within light guide 14. Since the non-absorbed flare light rays pass through filter 46 twice, their spectral characteristic is modified in proportion to the square of filter 46's spectral transmittance characteristic.

Figure 4:
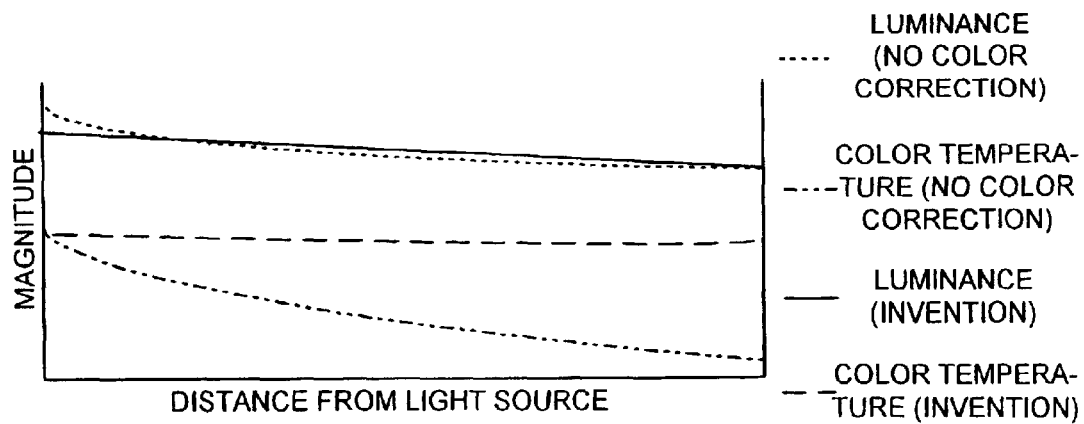
FIG. 4 graphically depicts luminance and color temperature variation as a function of distance along the FIGS.

Light emitted through aperture 20 at distances close to light source 12 is perceived as having the same color as light emitted through aperture 20 at distances farther from light source 12. This is because near-end absorption of blue flare light rays as a function of distance along light guide 14 "reddens" the emitted light in inverse proportion to the aforementioned reddening caused by the refractive index and light transmissivity characteristics of light guide 14's dielectric material. That is, the emitted light contains proportionately more red light rays and proportionately fewer blue light rays at distances along light guide 14 closer to light source 12, giving that emitted light the same apparent color as light emitted at distances farther from light source 12. By increasing the width $W_F$ (FIG. 3C) of filter 46 as a function of distance along light guide 14 one may controllably adjust the color temperature of the emitted light as a function of distance along light guide 14 to achieve the desired inverse proportionality between the near-end reddening effect of filter 46 and the far-end reddening effect of light guide 14's dielectric material, to yield uniform color temperature as a function of distance along light guide 14 as seen in FIG. 4. As FIG. 4 graphically illustrates, this yields uniform color temperature as a function of distance along light guide 14 with about a 30% reduction of luminaire 36's luminance characteristic and only about a 3% absorption loss of the light rays guided along light guide 14.

Controlled flare light coloration as aforesaid also reduces the effects of glare at distances along light guide 14 closer to light source 12, with minimal loss of light due to absorption by filter 46. This is because, as mentioned above, filter 46 reduces total light output in proportion to the square of filter 46's spectral transmittance characteristic. Consequently, the luminous flux of any glare output is simultaneously reduced as a function of distance along light guide 14.

Filter 46 can be sized and positioned within luminaire 36 so that its maximal color correcting effect occurs at any desired distance along light guide 14. In typical interior space illumination applications, the maximal color correcting effect (typically a color temperature reduction of about 100 degrees Kelvin) occurs at the near end of light guide 14 closest to light source 12.

As will be apparent to those skilled in the art in the light of the foregoing disclosure, many alterations and modifications are possible in the practice of this invention without departing from the spirit or scope thereof. For example, filter 46 need not be "purely" yellow but need only have a yellow hue in order to provide a useful color correcting effect. Thus, filter 46 may be yellow-green, yellow, orange, red, etc. Each different yellow hued filter provides a correspondingly different color temperature reduction, necessitating adaptation of each different filter's length and width to attain a desired color temperature reduction for a given luminaire containing a given light guide.

More generally, FIG. 5 depicts the well known CIE-1931 (Commission Internationale de l'Éclairage) chromaticity diagram, with triangle 48 superimposed over a color gamut representative of filter colors suitable for use in practicing the invention. More particularly, color gamut triangle 48 has apices corresponding to the set of three CIE-1931 values: 4800° Kelvin (i.e. x=0.351, y=0.356); 570 nm (i.e. x=0.44, y=0.55) and 600 nm (i.e. x=0.63, y=0.37).

The length and width of filter 46 can be adjusted to accommodate different types of light sources which may project differently shaped flare ray plumes of varying intensity (color saturation) onto light guide 14. For example, some luminaire light sources have reflectors which produce relatively low amounts of high angle flare rays and relatively large amounts of low angle flare rays. Consequently, the flare ray plume may have a greater width and a greater intensity of flare rays at distances along light guide 14 which are farther away from light source 12 than at distances closer to light source 12, with the plume's width and intensity tapering off toward the far end of light guide 14 after attaining maximum values somewhere in the middle of light guide 14. In such situations it may be appropriate that filter 46 have a diamond-like shape (i.e. increasing in width as a function of distance along light guide 14 to a maximum width, then decreasing in width as a function of distance along light guide 14); and, that filter 46's color intensity (color saturation) increase as a function of distance along light guide 14 to a maximum intensity, then decreasing in intensity as a function of distance along light guide 14. Other more complex filter shape and intensity variations may be required to attain a desired color temperature reduction for flare ray plumes having more complex shape or intensity variations.

The color intensity of filter 46 can be varied by printing a suitably colored dot pattern onto an appropriate substrate, with the dot spacing varying as a function of distance along light guide 14, or varying in some other manner corresponding to the flare ray plume's intensity variation. Half tone or color gel color printing techniques can also be used to vary the pattern's color intensity as a function of distance along light guide 14.

The physical width of filter 46 need not be varied in order to attain the desired width variation effect. For example, a suitably colored dot pattern can be printed onto a film substrate, with the pattern's width varying as a function of distance along light guide 14. Alternatively, a half tone color printing technique can be used to vary the pattern's color intensity as a function of distance along light guide 14, thereby simulating width variation of filter 46. Width variation can also be simulated by using different color gels as a function of distance along light guide 14 to form the pattern.

What is claimed is:

1. A luminaire, comprising:
   (a) a longitudinally extending hollow prismatic light guide;
   (b) a light source for emitting light into one end of said light guide;
   (c) an opaque cover partially enclosing said light guide, said cover having a reflective inner surface and a longitudinally extending light emitting aperture; and,
   (d) a transparent filter positioned between said light guide and said cover, said filter having:
      (i) a width which varies as a function of distance along said light guide; and,
      (ii) a color characteristic corresponding to any color within a color gamut triangle having apex values of 4800° Kelvin, 570 nm and 600 nm on a CIE-1931 chromaticity diagram.

2. A luminaire as defined in claim 1, wherein said filter is positioned at said one end of said light guide.

3. A luminaire as defined in claim 1, wherein said filter is positioned at a selected distance from said one end of said light guide.

4. A luminaire as defined in claim 1, wherein said filter has a color hue intensity which varies as a function of distance along said light guide.

5. A luminaire as defined in claim 1, wherein said filter has a width which increases as a function of distance along said light guide.

6. A luminaire as defined in claim 1, wherein said filter has:
   (i) a color hue intensity which varies as a function of distance along said light guide; and,
   (ii) a width which increases as a function of distance along said light guide.

7. A luminaire as defined in claim 4, wherein:
   (i) said filter has greater color hue intensity at a first selected distance along said light guide than at a second selected distance along said light guide; and,
   (ii) said first selected distance is closer to said one end than said second selected distance.

8. A luminaire as defined in claim 1, wherein:
   (i) said light guide is formed of a material which absorbs blue light rays such that more red light rays are guided along said light guide at distances father from said one end than at distances closer to said one end; and,
   (ii) said filter absorbs blue light rays such that fewer blue light rays which escape through said light guide are reflected by said cover through said filter and through said light guide at distances closer to said one end than at distances farther from said one end.

9. A method of varying the color temperature of light emitted by a luminaire having a hollow prismatic light guide formed of a material which absorbs blue light rays such that more red light rays are guided along said light guide at distances farther from a light input end of said light guide than at distances closer to said light input end, said method comprising:
   (a) color filtering light rays which escape through said light guide at points close to said light input end, said color filtering further comprising absorbing more blue light rays which escape through said light guide at points close to said light input end than at points farther from said light input end; and,
   (b) reflecting said color filtered light rays into said light guide;
wherein said color filtering further comprises passing said light rays which escape through said light guide at points close to said light input end through a filter having a color characteristic corresponding to any color within a color gamut triangle having apex values of 4800° Kelvin, 570 nm and 600 nm on a CIE-1931 chromaticity diagram.

10. A method as defined in claim 9, wherein said color filtering further comprises color filtering as a function of distance along said light guide.

11. A method as defined in claim 9, wherein said color filtering further comprises color filtering as a function of distance along said light guide and in inverse proportion to said absorption of blue light rays by said light guide material.

* * * * *